June 14, 1927.  
W. R. DARNELL  
1,632,435  
SWIVEL CASTER WITH BRAKE AND LOCK  
Filed Aug. 19, 1926
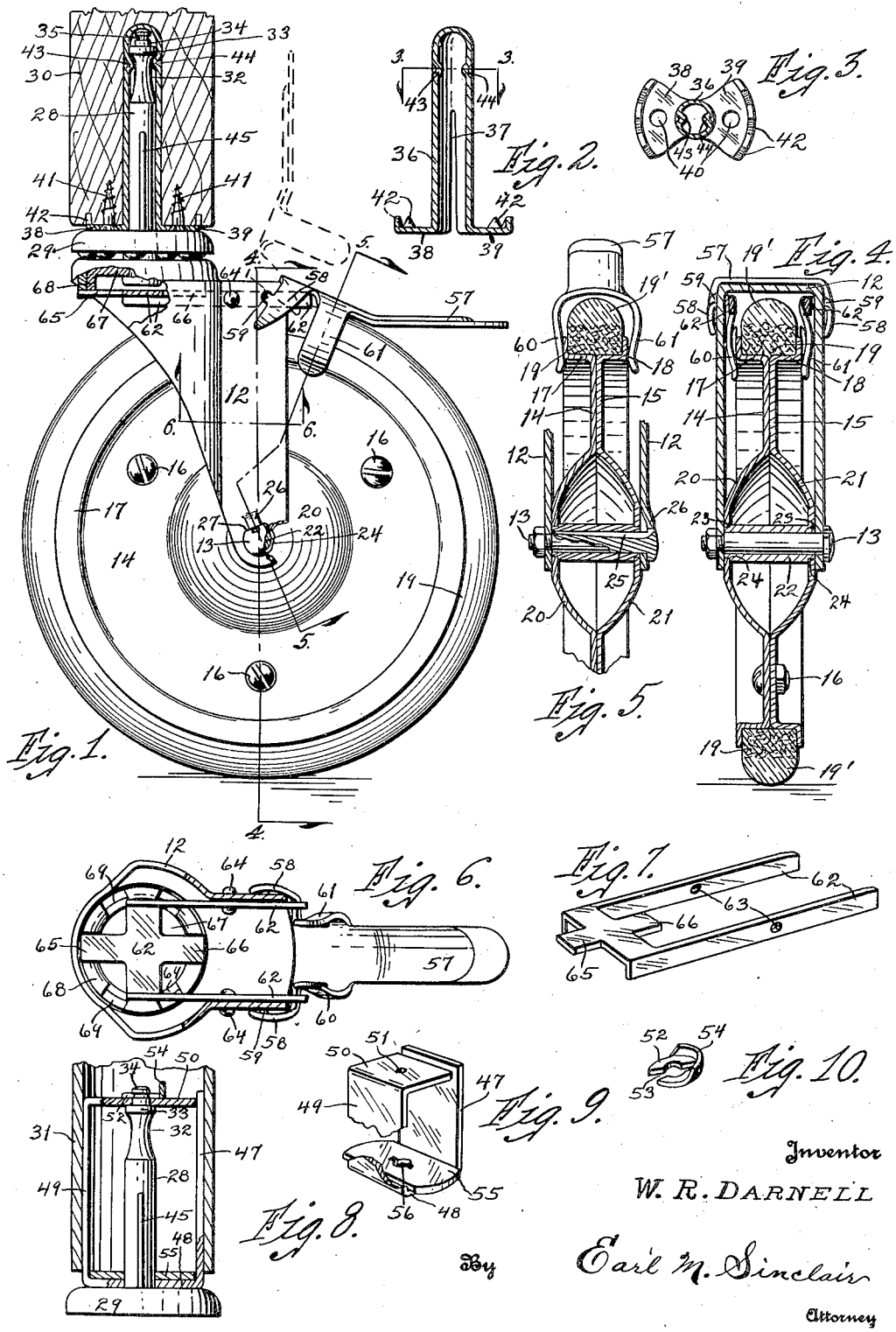
Inventor  
W. R. DARNELL  
By Earl M. Sinclair  
Attorney Patented June 14, 1927.

1,632,435

UNITED STATES PATENT OFFICE.

WALTER RALEIGH DARNELL, OF LONG BEACH, CALIFORNIA.

SWIVEL CASTER WITH BRAKE AND LOCK.

Application filed August 19, 1926. Serial No. 130,172.

One object of this invention is to provide an improved swivel caster having a stem so constructed and arranged that it is adapted for use either with a close fitting thimble or with a spring frame having a relatively large central chamber, and also to provide improved constructions for the thimble and the spring frame to be used on such caster stem.

A further object of the invention is to provide an improved construction for a caster wheel, and more specifically for a rubber tired wheel.

Still another object is to provide an improved brake device adapted for manual operation to prevent rotation of the wheel at times, together with locking means to prevent swiveling of the caster, which locking means is actuated conjunctively with the brake device.

With these and other objects in view, my invention consists in the construction, arrangement and combination of elements hereinafter set forth, pointed out in the claims and illustrated by the accompanying drawing, in which—

Figure 1 is a side view of my improved caster, partly in section, the brake and lock devices being shown in operative position, the released position of the brake being indicated by dotted lines.

Figure 2 is a vertical section of the thimble detached.

Figure 3 is a cross-section of the thimble on the line 3—3 of Figure 2.

Figure 4 is a cross-section of the caster wheel and the brake device on the line 4—4 of Figure 1.

Figure 5 is a similar view on the line 5—5 of Figure 1.

Figure 6 is a horizontal section illustrating the brake and lock devices, on the line 6—6 of Figure 1.

Figure 7 is a perspective view of the locking lever detached from the remaining elements.

Figure 8 is a vertical section illustrating how the caster stem is assembled with the spring frame.

Figure 9 is a perspective view, partly broken away, of the spring frame structure employed.

Figure 10 is a perspective view of the clip employed for holding the caster stem and spring frame together.

In the construction of the devices as shown a caster yoke is employed, which is designated by the numeral 12, the lower ends of the arms if said yoke carrying an axle 13 of bolt form, on which a caster wheel is rotatably mounted. The wheel as here shown is formed of metal by stamping and is composed of two mating side plates 14 and 15 of like construction, annular portions of which are in close contact, between the hub and rim, and securely held together by bolts or rivets 16. Beyond the contacting portions the side plates of the wheel are formed with right-angled rim portions 17 and 18 respectively, between which a tire 19 is securely gripped, said tire preferably being of rubber or like composition. As here shown the tire 19 has its main portion formed of a tough wear-resisting composition, preferably containing cotton fibres, and outside of such portion is a softer tread portion 19' adapted for contact with the floors and so constructed as not to have a wearing effect on floors or floor coverings. Radially within the contacting portions of the side plates are integral hub portions 20 and 21 which are flared or embossed outwardly to strengthen the structure and to substantially fill the space between the wings of the yoke 12, which hub portions are formed with central apertures for the axle 13. A sleeve 22 is mounted directly on the axle and at each end is formed with two flat portions 23 and 24 engaging similarly formed portions in the hub of the wheel to prevent the wheel from turning on the sleeve. The reduced portions of the sleeve having the flat faces extends through the wheel plates and provides a hardened side thrust bearing revolving against the yoke at each side. The axle 13 is shouldered at one end so that when the parts are assembled the wheel cannot be pinched too tightly, but just the right amount of space is provided for free rotation. There is also a longitudinal oil groove 25 (Fig. 5) formed in the axle bolt so that the bearing sleeve 22 may be suitably lubricated from time to time. I have further provided a means to prevent turning of the axle, consisting of a lug 26 formed on one arm of the yoke 12 (Figs. 1 and 5) engaging a flat side 27 on the head of the axle bolt. It will thus be seen that I have provided a caster wheel of simple and efficient and at the same time economical construction, and that I have eliminated all unnecessary movement, friction and wear between the parts of the wheel and yoke.

Above the top of the wheel yoke 12 is an upwardly projecting stem 28 of relatively small diameter, having a swivel connection to said yoke, preferably through a ball bearing assembly 29 engaging the top of said yoke. It may be desired to use the caster on the leg such as 30 of a chair or the like, having a relatively small opening, as shown in Figure 1; or it may be desired to use in connection with the leg 31 of a bed or the like having a relatively large opening, as in Figure 8. I have constructed the caster stem 28 in such manner that it may be employed with suitable devices for holding it in either type of load object, without any change of the stem. The stem 28 is of uniform diameter from a point immediately above the ball assembly 29 nearly to its upper end, where it is formed with a circumferential depression or groove 32, above which is a short flange 33 of the same diameter as the main portion of the stem. Above the flange 33 is a stud 34 of less diameter, formed with a narrow circumferential groove 35.

When it is desired to use the caster with a wooden leg such as 30, or other object having a small socket, the thimble shown in Figures 1, 2 and 3 is employed. The thimble 36 is cylindrical in general form and closed at its upper end somewhat above the upper end of the stem 28, and is of a diameter to fit snugly the said stem. The thimble is formed of a single piece of metal by drawing and stamping, and its upper portion is drawn out for a considerable distance to extend below the depression 32 of the stem. The lower portion of the thimble is then formed by stamping so that opposite vertical slits 37 are produced extending to its lower end, one of which is shown in Figure 2. At its lower end the thimble is formed with laterally extending attaching flanges 38 and 39 of any desired shape, formed with holes 40 by which the thimble may be attached to the load object as by screws 41. The flanges 38 and 39 also may be formed with teeth 42 adapted to be driven into the load object. The attaching flanges 38 and 39 contact the lower face of the load object 30 and rest upon the ball assembly 29, the heads of the screws 41 being countersunk. Near its upper end, and within its drawn portion, the thimble 36 is formed with oppositely located internal lugs 43 and 44, formed by forcibly denting in the metal, which lugs are adapted to extend within the circumferential depression 32 of the stem and hold the stem in place in the thimble. The lugs 43 and 44 are not long enough to prevent insertion of the stem in the thimble by the application of a degree of force, but are sufficient to prevent any accidental displacement of the stem. The stem 28 is formed with opposed vertical fins 45, one of which is shown in Figure 1, extending upwardly from its lower end a considerable distance, which fins are adapted to bite and gouge into the metal of the thimble 36 when the stem is inserted. It is the function of the fins 45 to prevent rotation of the stem within the thimble, it being the design that all rotary motion occur between the stem and the wheel yoke as the friction is there reduced by means of the ball assembly 29.

When the caster is employed with a tubular leg such as 31 the spring frame shown in Figures 8 and 9 is used, which frame fits yieldingly in the relatively large opening of the load object. The spring frame is formed of a single strip of metal, one end of which constitutes a side member 47, the strip being bent at right angles at the lower end of said side member to form a base member 48 having a central aperture to receive the stem 28. The strip is again bent to form another side member 49 opposite to and parallel with the first side member but of slightly less length, and is then bent transversely to form a top member 50 extending toward and abutting the first side member 47. The top member 50 is formed with a hole 51 to receive the stud 34 of the caster stem, and a clip 52 (Fig. 10) having a lateral opening 53, is employed to hold the stem in place in the spring frame device. The clip 52 is mounted in contact with the top member 50 of the spring frame and then moved laterally until its opening 53 engages the peripheral groove 35 of the stud portion of the stem. The clip 52 preferably is of spring metal, and some force is required to cause the engagement above noted, so that the connection is a stable one, and said clip may be formed with an upturned flange 54 at one side to serve as a handle for placing it. It is clear that other suitable means may be employed, however, for making this connection. Mounted within the spring frame device, and resting on the bottom member 48, is a cross plate 55 having a hole 56, which may be of key-hole shape, to receive the caster stem, which plate projects at its ends beneath and serves as a support for the load object 31. The fins 45 of the stem prevent turning of the stem relative to the cross plate and spring frame as in the other construction. The depression 32 has no function when the stem is used with the spring frame, just as the reduced stud 34 and peripheral groove 35 have no function when used with the thimble; but the stem formed as described is interchangeably usable with both types of connecting or attaching means.

When the caster is used with certain devices, such for instance as washing machines, dryers, hospital beds and the like, it is desirable to have means whereby at times the caster wheel may be kept from turning, and also whereby the swiveling means may be locked against rotation. I have provided means for simultaneously locking these two functions. A brake lever 57 is formed at one end with a spring yoke 58 which straddles the upper portion of the wheel yoke 12 and is pivotally secured thereto by inturned lugs 59 engaging in holes in the wheel yoke. Between its ends the brake lever 57 is formed with down turned wings 60 and 61 which are spaced apart sufficiently to receive the edge of the caster wheel between them. The wings 60 and 61, which are of spring construction, are flared apart slightly at their free ends to facilitate engagement with the wheel, and when the lever 57 is depressed, as by pressure with the foot of the operator, to the position shown by full lines in Figure 1, and in Figures 4 and 5, said wings frictionally engage the outer sides of the rim portions 17 and 18 of the wheel plates and tend to prevent rolling of the wheel. It will be noted that there is no frictional engagement with the wheel tire 19, so that there is no undue wear thereon, the engagement being with the metal rim. The yoke portion 58 of the brake lever is extended past the pivot lugs 59, and when the brake lever is raised, as indicated by dotted lines in Figure 1, this extended portion engages the top of the wheel yoke and serves to hold the brake device in inoperative position. The brake lever 57 is preferably of sufficient length to project well over the wheel, so that it may be raised by the foot of the operator engaging beneath its end with lifting force.

The locking device for the caster swivel comprises a locking lever 62, of yoke form, shown particularly in Figure 7. This lever is formed between its ends with holes 63 in its arms by which it is pivotally mounted, by rivets 64, to the top part of the wheel yoke 12, being arranged in substantially horizontal position between the upper ends of the arms of the wheel yoke. The closed end of the yoke-shaped locking lever 62 extends beneath the swiveling axis of the caster, that is beneath the stem 28, and is formed with oppositely and laterally extending locking lugs 65 and 66, which are thus arranged diametrically of the top plate of the wheel yoke. Riveted to the lower end of the stem 28, beneath the top plate of the wheel yoke 12, is a circular locking plate 67 having a depending peripheral flange 68 formed with a series of notches 69 disposed in diametrically arranged pairs for the reception of the locking lugs 65 and 66. When the locking lugs of the locking lever 62 are thus engaged in the notches of the locking plate 67, it is evident that the wheel yoke is prevented from swiveling or turning relative to the stem and load object, it having been previously shown that the stem is held against turning in the load object. The locking lever 62 is moved to locking position when the brake lever 57 is depressed, by engagement of said brake lever with the free ends of the yoke arms of said locking lever, which ends project beyond the margin of the wheel yoke as clearly shown in Figure 1. When the brake lever is raised, the locking lever 62 moves to inoperative position by gravity, the closed end with its locking lugs 65 and 66 being of greater weight than the free ends of the yoke. This brake and locking means provides an effective and at the same time a simple and inexpensive means to lock the caster when desired, both as to rotation of the wheel and as to the swiveling function.

It should be noted that the stem 28 contacts closely with the wall of the thimble 36 for a considerable distance above its lower end, and also for a short distance above the depression 32, thus preventing any oscillation of the stem in the thimble which might be induced by the trailing relation of the wheel.

I claim as my invention—

1. A swivel caster comprising a wheel yoke, a stem rising therefrom and a wheel journaled in said yoke, in combination with a brake device comprising a lever pivoted on said yoke and formed between its ends with spaced spring wings adapted to engage and grip opposite sides of the peripheral portion of said wheel.

2. The combination with a caster having a wheel yoke, a stem rising therefrom and a wheel journaled in said yoke, of a brake device comprising a lever pivoted on said yoke, a pair of resilient wings formed on said lever and adapted to embrace the peripheral portion of said wheel and tend to prevent rotation thereof, and means on said lever for engaging the yoke to hold the brake device inoperative.

3. The combination with a swivel caster having a wheel yoke, a stem having a swivel connection therewith and a wheel journaled in said yoke, of a brake lever pivoted on said yoke and having a pair of resilient wings to grip the peripheral portion of said wheel when the lever is depressed, and a locking lever fulcrumed in the top portion of said yoke and having one end adapted to be engaged by said brake lever when the latter is depressed, together with means connected with the stem adapted to be engaged by the opposite end of said locking lever to lock the yoke against swiveling on said stem.

4. The combination with a swivel caster having a wheel yoke, a stem having a swivel connection therewith and a wheel journaled in said yoke, of a brake lever pivoted at one end on said yoke and having a pair of resilient wings adapted to grip a peripheral portion of the wheel when said lever is depressed, a locking lever fulcrumed between its ends in the upper portion of said yoke and having one end engageable by the brake lever when the latter is depressed, a notched member fixed to the stem and extending within the wheel yoke, and means on said locking lever for engaging said notched member to prevent the swiveling function.

5. The combination with a swivel caster having a wheel yoke, a stem having a swivel connection therewith and a wheel journaled in said yoke, of a locking device comprising an annular member fixed to the stem and extending within the wheel yoke, said annular member being formed with a series of peripheral notches, a locking lever pivoted between its ends in the upper portion of said yoke, and means on said locking lever for selectively engaging in the notches of said annular member.

6. The combination with a load object having a socket an attaching member mounted in said socket, a swivel caster having a wheel yoke, a stem having a swivel connection with said yoke and a wheel journaled in said yoke, of a locking device comprising an annular member fixed to the stem and extending within the wheel yoke, said annular member being formed with a series of peripheral notches, a locking lever pivoted between its ends in the upper portion of said yoke, means on said locking lever for selectively engaging in the notches of said annular member, said stem arranged to be received in said attaching member, and means to prevent rotary movement of said stem in said attaching member.

WALTER RALEIGH DARNELL.